Jan. 7, 1958     C. O. MYER     2,819,141
CUTTING BOARD DRAWER CONSTRUCTION
Filed May 21, 1954     3 Sheets-Sheet 1
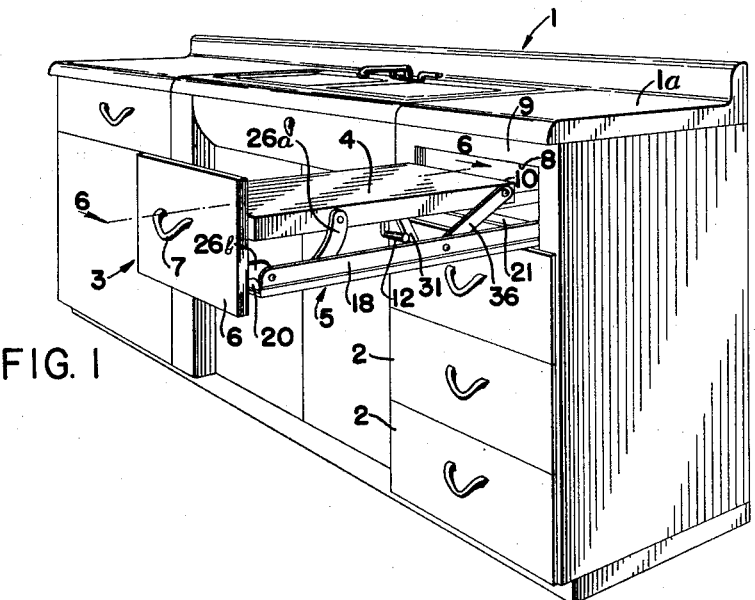
FIG. 1
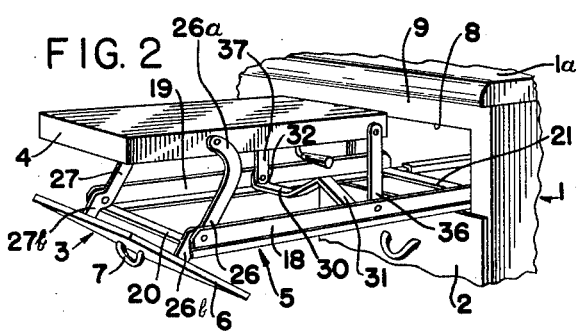
FIG. 2
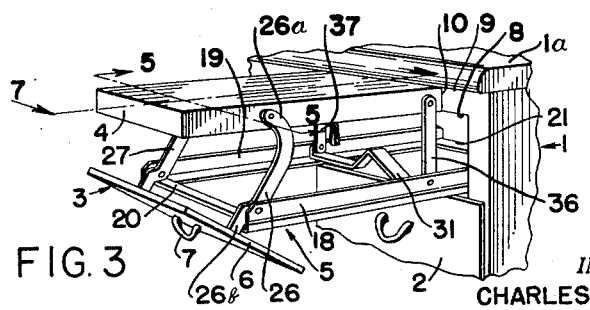
FIG. 3
INVENTOR.
CHARLES O. MYER
BY 
ATTORNEYS

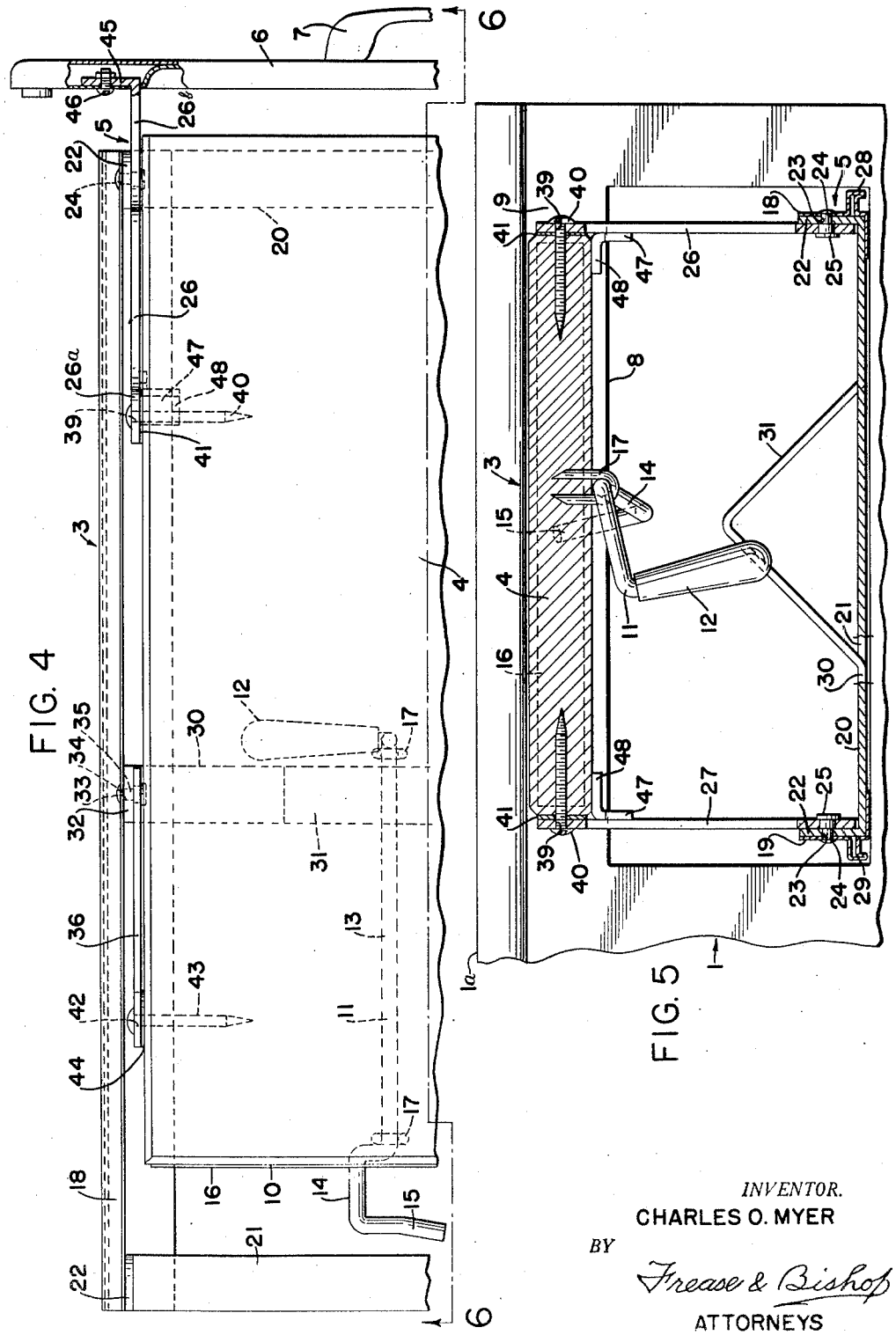

Jan. 7, 1958     C. O. MYER     2,819,141
CUTTING BOARD DRAWER CONSTRUCTION
Filed May 21, 1954     3 Sheets-Sheet 3
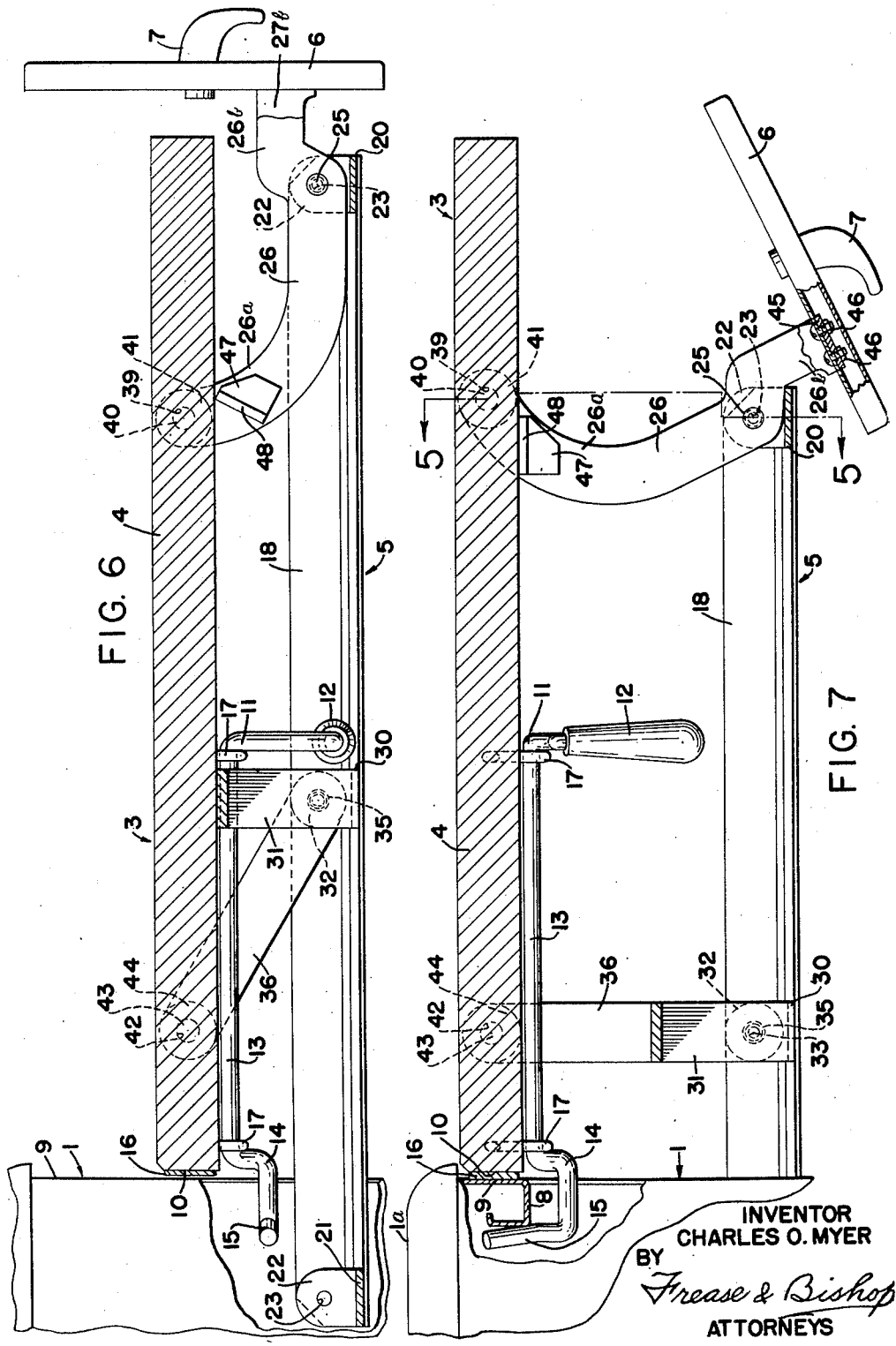
INVENTOR
CHARLES O. MYER
BY
Frease & Bishop
ATTORNEYS United States Patent Office 2,819,141
Patented Jan. 7, 1958

2,819,141

CUTTING BOARD DRAWER CONSTRUCTION

Charles O. Myer, Warren, Ohio, assignor, by mesne assignments, to American Radiator & Standard Sanitary Corporation, New York, N. Y., a corporation of Delaware Application May 21, 1954, Serial No. 431,352

4 Claims. (Cl. 312—303)

This invention relates generally to a bread board or cutting board ordinarily used as a kitchen accessory for slicing bread, cutting or chopping vegetables, trimming meats, etc. More particularly the invention relates to a folding cutting board mounted in a drawer of a base cabinet for a kitchen.

Ordinarily a cutting or bread board is of the shelf type that is pulled out from a horizontal slot in a cabinet or cupboard.

Such board is usually supported only at its inner edge and therefore is not capable of resisting much downward pressure. In some cases the board may be completely withdrawn from its slot and placed on the top of a cabinet or table, but in such event the board occupies top space that may be desirable or necessary for other kitchen operations. Moreover, when the board is placed on a top surface, its edge is not then available for the mounting of a food grinder.

Other boards may be vertically mounted during storing either within a vertical slot or on the inner surface of a cabinet door, from which place the board can be lifted to a horizontal position. This construction is likewise objectionable because the board is unsatisfactorily mounted to withstand much downward pressure. In addition, such boards are usually mounted too low with respect to the work surface of the cabinet or cupboard.

To overcome these disadvantages and to achieve a maximum of efficiency, a cutting board is provided that is mounted within a drawer of a sink or kitchen cabinet. The drawer may be extended from the cabinet and the cutting board raised therefrom to a height substantially level with the work surface of the cabinet.

Accordingly, it is a primary object of this invention to provide a readily accessible cutting board mounted in a drawer of a kitchen cabinet.

It is another object of this invention to provide a cutting board at a convenient level and substantially at the same height as the work surface of a cabinet.

It is another object of this invention to provide a cutting board rigidly mounted and capable of withstanding a substantial load.

It is another object of this invention to provide a cutting board mounted within a drawer, the edges of which board are available for mounting a food grinder, etc.

Finally, it is an object of this invention to provide a cutting board drawer which is inexpensive in construction and which satisfies the foregoing objects and desiderata.

These and other objects and advantages apparent to those skilled in the art from the following description and claims may be attained, the stated results achieved, and the described difficulties overcome, by the discoveries, principles, apparatus, parts, combinations, subcombinations and elements which comprise the present invention, the nature of which is set forth in the following general statement, the preferred embodiment of which—illustrative of the best mode in which applicant has contemplated applying the principles—is set forth in the following description, and which is particularly and distinctly pointed out and set forth in the appended claims forming part hereof.

Generally, the cutting board drawer constituting the present invention includes a cutting board mounted in an upper drawer of a sink or kitchen cabinet, which board is mounted on parallel link members so that upon withdrawing the drawer on conventional slide members from the cabinet the board may be raised to an operable position and locked into place at substantially the same level as the cabinet work surface, the parallel link members rigidly supporting the board above the drawer slide members.

Referring to the accompanying drawings which are illustrative of the preferred embodiment of the invention, by way of example, and in which similar numerals refer to similar parts throughout:

Fig. 1 is a perspective view of a combination kitchen sink and cabinet showing a cutting board mounted in a collapsed position within an extended top drawer of the cabinet;

Fig. 2 is a fragmentary, perspective view of the cabinet and drawer showing the cutting board raised from the position shown in Fig. 1;

Fig. 3 is a fragmentary, perspective view showing the cutting board raised and locked into position with respect to the top work surface of the cabinet;

Fig. 4 is an enlarged, fragmentary, plan view of the cutting board in a collapsed position within the drawer;

Fig. 5 is an enlarged, vertical, sectional view taken on the lines 5—5 of Figs. 3 and 7;

Fig. 6 is a longitudinal, sectional view taken on the line 6—6 of Figs. 1 and 4; and Fig. 7 is a longitudinal, sectional view, showing the cutting board in position for operation and locked in place, taken on the line 7—7 of Fig. 3.

In Fig. 1 a cabinet sink is generally indicated at 1 having a top work surface 1a, and having drawers 2, including a cutting board drawer generally indicated at 3. It is preferred that the cutting board drawer 3 occupy the uppermost position with respect to the drawers 2. The cutting board drawer 3 includes a cutting board 4 which is mounted upon a slide assembly generally indicated at 5, and a drawer panel 6 having a drawer pull 7.

Briefly, the successive stages by which the board 4 is placed in operating position (Fig. 3) are shown in Figs. 1, 2 and 3. As shown in Fig. 1 the cutting board 4 is in a collapsed position within the fully extended drawer 3; that is, the board 4 is in its lowermost position in order to clear a lower edge 8 of a drawer frame member 9 which extends horizontally beneath the top surface 1a of the sink cabinet 1. In Fig. 2 the board 4 is raised from the collapsed position to the operating position substantially level with the top surface 1a of the sink 1. To achieve the latter position, the board 4 is moved longitudinally of the assembly as well as upwardly requiring the drawer 3 to be fully extended in order for the inner end 10 of the board 4 to clear the lower edge 8 of the drawer frame member 9 during this movement. At this stage the inner end 10 of the board 4 is spaced from the frame member 9. In Fig. 3 the drawer 3 has been pushed back into the cabinet partially until the end 10 of the board 4 abuts the drawer frame member 9 where it is locked in place by means of a locking clamp 11 (Fig. 7) which is attached to the undersurface of the board.

In particular, the clamp 11 includes a handle 12, an intermediate longitudinal portion 13 and a clamping portion 14 having a transverse prong 15 for engaging the side of the door frame member 9 opposite the side abutting the end 10 of the board 4. As shown in Fig. 7, the drawer frame member 9 is preferably composed of sheet metal material and has a substantially U-shaped transverse cross-section. In addition, the end 10 of the board 4 is provided with a strip 16 of soft material to prevent abrasion or marring of the surface of the member 9 by the broad. Finally, the longitudinal portion 13 of the clamp 11 is rotatably attached to the undersurface of the board 4 by means of a pair of staples 17 (Figs. 5 and 7). Hence, by turning the handle 12 of the clamp 11 from the position of Fig. 6 to the position of Fig. 7, the board 4 may be locked against the drawer frame member 9 to prevent longitudinal movement of the drawer 3 or board 4 while in use.

The slide assembly 5 by which the drawer 3 is moved in and out of the cabinet sink 1 includes a pair of spaced slides 18 and 19 extending longitudinally of the drawer 3, together with a pair of spacers 20 and 21 extending transversely between opposite extremities of the slides 18 and 19. The spacer 20 is attached to the front end of the slide assembly 5 and the spacer 21 is secured at the rear end thereof. The extremities of each spacer 20 and 21 include flange portions 22 (Figs. 5 and 6) which are apertured at 23 to register with apertures 24 in the slides 18 and 19. A shouldered rivet 25 extends through the aligned apertures 23 and 24, respectively, in the front spacer 20 and in the slides 18 and 19 (Fig. 5). Each rivet 25 holds the flanges 22 of the spacer 20 in position with respect to the slides 18 and 19. Moreover, the rivets 25 serve as pivots about which a pair of bell crank levers 26 and 27 are mounted to the slide assembly 5. Finally, the slides 18 and 19, being preferably composed of sheet metal, such as sheet steel, include roller channels 28 and 29 respectively, having inverted U-shaped transverse cross-sections and extending longitudinally thereof which serve as runners in which the usual drawer rollers are mounted.

In addition to the spacers 20 and 21, a spacer stop 30 (Fig. 4) is provided between the slides 18 and 19 and parallel with the spacers. The spacer stop 30 includes an inverted V-portion 31 (Fig. 3), the apex of which serves as a stop for the board 4 (Fig. 5) when it is disposed in a collapsed position within the drawer 3. Likewise, the spacer stop 30 is provided with flanged extremities 32 (Figs. 4 and 7) similar to the extremities 22 on the spacers 20 and 21. The flanged extremities 32 are also apertured at 33 to register with similar apertures 34 in the slides 18 and 19. Shouldered rivets 35, similar to rivets 25, extend through the apertures 33 and 34 and serve as pivot points for links 36 and 37 (Figs. 2, 6 and 7).

As was stated above, the panel 6 is used not only to withdraw the drawer 3 from the cabinet sink 1, but also to raise the board 4 from the collapsed position as shown in Fig. 1 to the raised position as shown in Fig. 2. In Figs. 4, 6 and 7, the manner in which the panel 6 is attached to the assembly is shown. Each bell crank lever 26 and 27, is pivoted at its respective shouldered rivet 25 at the forward extremities of the slides 18 and 19, respectively. The bell crank levers 26 and 27 include similar upturned portions 26a and 27a, respectively, the upper ends of which are provided with apertures 39 through which extend screws 40 (Fig. 4) by which the levers 26 and 27 are attached to opposite sides of the board 4. A washer 41 is provided between the levers 26 and 27 and their adjacent sides of the board 4.

In a similar manner, the upper extremities of the straight links 36 and 37 are apertured at 42 (Figs. 6 and 7) and screws 43 extend therethrough into the opposite sides of the board 4, there being washers 44 disposed between the apertured ends of the links 36 and 37 and their respective sides of the board 4.

In addition to the upturned portions 26a and 27a, the bell crank levers 26 and 27 include portions 26b and 27b, respectively, between the rivets 25 and the panel 6, which portions are provided with similar end flanges 45 (Figs. 4 and 7) to which the panel 6 is secured by means of screws 46 (Fig. 7). Thus, the panel 6 is rigidly secured to the slide assembly 5 through the portions 26b and 27b. In order to pull out or push in the drawer 3 from the cabinet sink 1, a longitudinal force is applied to the handle 7 of the panel 6, which force is transmitted through the levers 26 and 27 to the slides 18 and 19.

In order to raise the board 4 from the lower position (Fig. 6) in which the undersurface of the board 4 rests upon the apex of the inverted V-portion 31 of the spacer stop 30, the panel 6 is turned downwardly to the position shown in Fig. 7, whereby the rotational force is transmitted through the levers 26 and 27 rotating about the screws 25 until the board 4 is in the uppermost position. To prevent further rotation and also to impart greater stability to the uppermost position of the board 4, the levers 26 and 27 are provided with link stops 47 (Figs. 5, 6 and 7), which are secured to the opposite surfaces of the levers 26 and 27. The link stops 47 have inturned flange portions 48 which are disposed at such an angle with respect to the levers that they abut the undersurface of the board 4 in its uppermost position (Fig. 7). In this position the clamp 11 may be actuated from the unlocked position of Fig. 6 to the locked position shown in Fig. 7.

Thus, the board 4 is mounted on a positioning means that includes links 36 and 37 and levers 26 and 27 arranged in a compact manner with respect to the board and the slide assembly 5. Both of the links 36 and 37 as well as the levers 26 and 27 cooperate by parallel motion linkage in raising and lowering the board 4 horizontally. The parallel motion linkage is provided by the links 36 and 37 of equal length, which length is equal to the distance between the ends of the upturned portions 26a and 27a of levers 26 and 27. Finally, in the operating position of the board 4, the upper ends of the links 36 and 37 and of the levers 26 and 27 are substantially directly above their lower pivots and are locked in place when the board is in use. Any forces applied to the board 4 during use are thereby transmitted vertically to the slide assembly 5 of the board 3.

Accordingly, there is provided a cutting board 4 which may be easily placed in operation or put away. As shown in Figs. 3 and 7, the operating position is a stable one and is substantially on the level with the top 1a of the sink 1, the end 10 of the board 4 being locked in place snugly against the front surface of the drawer frame member 9. In addition, the edges of the board 4 are available for mounting of a clamp for a meat grinder or other device, if desired.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown.

Having now described the features, constructions and principles of invention, the characteristics of the new cutting board drawer, and the advantageous, new and useful results provided; the new and useful discoveries, principles, parts, elements, combinations, subcombinations, structures and arrangements, and mechanical equivalents obvious to those skilled in the art, are set forth in the appended claims.

I claim:

1. Kitchen cabinet cutting board construction including, a drawer, and a drawer frame member, the drawer including a pair of spaced slide members movable longitudinally through the drawer frame member, a drawer panel attached to the slide members, a cutting board within the drawer, mounting means connecting the members and board supporting the board in a collapsed position within the drawer when the drawer is closed and in an elevated position when the drawer is open, said mounting means including a pair of support links pivotally mounted at their ends respectively to the board and to the slide members, said mounting means also including a pair of bell crank levers pivotally mounted on corresponding slide members, one end of each lever being pivotally mounted on the board and the other end of each lever being secured to the panel, and a locking clamp on the board engageable with the drawer frame member for holding the board in abutment with the drawer frame member when the board is elevated.

2. The construction defined in claim 1 in which the locking clamp includes a longitudinal portion attached to the undersurface of the board and includes a transverse end portion engageable with the drawer frame member.

3. Kitchen cabinet cutting board construction including, a drawer, and a drawer frame member, the drawer including a pair of spaced parallel slide members movable longitudinally through the drawer frame member, a drawer panel defining the front of the drawer, a cutting board within the drawer and movable between a collapsed position when the drawer is closed and an elevated position when the drawer is open, a support link pivotally attached to and extending from each edge of the board to a corresponding slide member and pivotally attached to said member, a bell crank lever pivotally mounted on each slide member, one end of each lever being pivotally mounted on a corresponding edge of the board and the other end of each lever being secured to the panel, a locking clamp mounted on the board and engageable with the drawer frame member when the board is elevated, and stop members on oppositely disposed sides of the bell crank levers and having portions extending centrally of the board for abutment with the undersurface of the board when the board is elevated.

4. Kitchen cabinet cutting board construction including, a drawer and a drawer frame member, the drawer including a pair of spaced slide members movable longitudinally through the drawer frame member, a drawer panel attached to the slide members, a cutting board within the drawer, mounting means connecting the members and board supporting the board in a collapsed position within the drawer when the drawer is closed and in an elevated position when the drawer is open, said mounting means including a pair of support links pivotally connected to the board and slide members and also including a pair of bell crank levers pivotally connected to the board and slide members, the panel being mounted on the levers, and stop members on the levers engaging and supporting the board when the board is moved to elevated position.

References Cited in the file of this patent
UNITED STATES PATENTS

| | | |
|---|---|---|
| 2,125,989 | Burch | Aug. 9, 1938 |
| 2,204,381 | Reeves | June 11, 1940 |
| 2,525,201 | Beynon et al. | Oct. 10, 1950 |
| 2,590,341 | Nabholz | Mar. 25, 1952 |
| 2,598,266 | Kamin | May 27, 1952 |